United States Patent [19]

Yamanaka et al.

[11] Patent Number: 5,735,081
[45] Date of Patent: Apr. 7, 1998

[54] SIDE DOOR FOR AUTOMOBILE

[76] Inventors: Takashi Yamanaka, No. 1693-11, Kamisaki, Kisai-machi, Kitasaitama-gun, Saitama-ken; Takuji Shimizu, No. 437-11, Kami, Kamisato-machi, Kodama-gun, Saitama-ken, both of Japan

[21] Appl. No.: 748,276

[22] Filed: Nov. 13, 1996

Related U.S. Application Data

[62] Division of Ser. No. 435,390, May 5, 1995, abandoned.

[51] Int. Cl.⁶ .................................................. E06B 3/00
[52] U.S. Cl. ........................... 49/506; 49/502; 29/897.2
[58] Field of Search ............................ 296/146.5, 146.6; 49/502, 506; 29/897.2

[56] References Cited

U.S. PATENT DOCUMENTS

| | | |
|---|---|---|
| 4,509,293 | 4/1985 | Ufrecht et al. |
| 4,648,208 | 3/1987 | Baldamus et al. |
| 4,811,517 | 3/1989 | Eckert et al. |
| 4,945,682 | 8/1990 | Altman et al. |
| 5,107,624 | 4/1992 | Passone . |
| 5,275,455 | 1/1994 | Harney et al. |
| 5,355,629 | 10/1994 | Kimura et al. |
| 5,577,796 | 11/1996 | Clausen ............................ 29/897.2 X |

*Primary Examiner*—Jerry Redman
*Attorney, Agent, or Firm*—Polster, Lieder, Woodruff & Lucchesi, LC

[57] ABSTRACT

The present invention is directed to provide an improved structure of a sash of the side door for automobiles, wherein rigidity of the door sash, hence rigidity of the side door as a whole, is augmented without increase in weight of the door sash, and without causing hindrance to the surrounding view. Such structure is realized by the box-shaped transverse sectional part (45) provided over the entire length of the door sash (4, 4A, 4B, 4C), of which the size (w) in the breadthwise direction of the vehicle is gradually changed, thereby progressively reducing thickness (W) of the door sash (4, 4A, 4B, 4C) in the breadthwise direction of the vehicle.

1 Claim, 6 Drawing Sheets

SIDE DOOR FOR AUTOMOBILE

This application is a divisional of Ser. No. 08/435,390 filed May 5, 1995, now abandoned.

BACKGROUND OF THE INVENTION a) Field of the invention

This invention relates to a structure of a door sash for automobiles, and more particularly it is concerned with a reinforced and light-weight door sash for passenger vehicles and small-sized cargo trucks, and so on.

b) Description of Prior Arts

The side door for automobiles requires appropriate reinforcing means in consideration of side collision, rigidity against lowering of the door, sealing property against water, wind, and so forth. For this purpose, the door panel for automobile constructed with an inner panel and an outer panel at the lower half part of the door incorporates therein reinforcing beams, while the door sash constituting the upper half part of the door is formed in a cross-sectional profile and a thickness having a required strength, and the root or stud part of the door sash, which is a connecting part with the door panel is reinforced with use of a press-formed part which is different from the door sash per se.

As a structure for strengthening the plug-in connection between the door sash, and the door panel, in particular, there has been known a structure of automobile door as described in Japanese laid-open patent application No. 5-270265. The invention as disclosed in this publication has its characteristic in that a reinforcing member with U-shaped cross-section is attached onto the lower, rear surface of the door sash to form a closed cross-sectional part (so-to-speak, a box-shaped transverse sectional part for reinforcement) with both door sash and reinforcing member, wherein this box-shaped transverse cross-sectional part is positioned, at least, above the lower edge of the window opening of the door.

However, this box-shaped transverse cross-sectional part for reinforcement as disclosed in this laid-open patent application is situated only at the lower part of the door sash, which is disadvantageous in that a large number of reinforcing parts should be used, which is liable to increase in the manufacturing cost, and that irregularity occurs in the product quality due to combination of a plurality of parts for the reinforcement.

In order therefore to avoid such disadvantage, there has been put into practice a door sash of a cross-sectional shape which is made up of a box-shaped transverse cross-sectional part, a glass-run holder part, a weather-strip holder part, and so forth, in an integral whole. However, current status is that a press-formed part is attached for further reinforcement at the stud part of the door sash, which is the most closely related with rigidity of the door. In particular, at a portion along the center pillar of the door sash, no roll-shaped part alone of a constant cross-sectional shape is satisfactory from the standpoint of automobile design, safety, etc. Therefore, the decor surface of the center pillar portion and the principal skeleton part are made up of press-shaped parts, to which are attached the weather strip-holder part and the glass-run holder part, which results in a highly expensive door sash.

From the standpoint of rigidity alone of the door sash, thickness of the box-shaped transverse cross-sectional part may be increased in the breadthwise direction of the vehicle (i.e., in the direction perpendicular to the surface of the side-window glass). However, when this box-shaped transverse cross-sectional part made to a thickness required for the purpose is formed over the entire length of the door sash, the weight of the vehicle increases due to this box-shaped transverse cross-sectional part. Further, at the portion along the front pillar and the center pillar, the surrounding view becomes hindered due to bulging-out of the box-shaped transverse cross-sectional part.

SUMMARY OF THE INVENTION

The present invention has been made in view of the above-mentioned points of problem, and aims at increasing rigidity of the door sash, hence rigidity of the side door as a whole, without increasing the weight of, the door sash per se and without hindering the surrounding view.

The present invention makes thickness of the door sash in the breadthwise direction of the vehicle to be gradually decreased from its lower part to the upper part by paying attention to the fact that, since the upper half part of the side door (that is, the door sash per se) becomes inwardly inclined, in general, as it goes upward, there is less possibility of an external force from the lateral side being exerted onto the upper part of the door sash; that rigidity of the door sash contributes to the increased mechanical strength of its stud portion; and that its strength becomes higher as the box-shaped transverse cross-sectional part becomes thicker and thicker in the breadthwise direction of the vehicle; and also, with a view to decreasing the weight of the door sash. Variations in thickness of the abovementioned door sash in the breadthwise direction of the vehicle is given by the gradual change in size in the direction of the vehicle width of the box-shaped transverse cross-sectional part provided over the entire length of the door sash. Also, the door sash, wherein the size of the box-shaped transverse cross-sectional part in the breadthwise direction of the vehicle changes gradually, can be constructed with a roll-shaped article made of a single sheet of material.

According to the present invention, in general aspect of it, there is provided a side door for automobiles, wherein thickness of the door sash in the breadthwise direction of the vehicle becomes gradually thinner from the lower part to the upper part.

According to the present invention, in another aspect of it, there is provided a side door for automobiles, wherein thickness of the door sash in the breadthwise direction of the vehicle becomes gradually thinner from the lower part to the upper part, by the gradual change in size of the box-shaped transverse sectional part, in the breadthwise direction of the vehicle width, provided over the entire length of the door sash.

The foregoing objects, other objects as well as specific construction and constituent elements for the automobile side door according to the present invention, will become more apparent and understandable from the following detailed description thereof, when read in conjunction with the accompanying drawing.

BRIEF DESCRIPTION OF ACCOMPANYING DRAWING

FIGS. 7(a)-7(e) shows sequential process steps for roll-forming of the front pillar portion and the roof portion of the door sash according to the present invention; and FIGS. 8(a)-8(g) shows sequential process steps for roll-forming of the center pillar portion of the door sash according to the present invention.

DETAILED DESCRIPTION OF PREFERRED EMBODIMENTS

With a view to enabling those persons skilled in the art to put the present invention into practice, more concrete explanations will be given hereinbelow about the side door for the automobile according to the present invention, which increases rigidity of the door sash, and, at the same time, decreases weight of the door sash, without hindrance to the surrounding view by the door sash.

Figure 1:
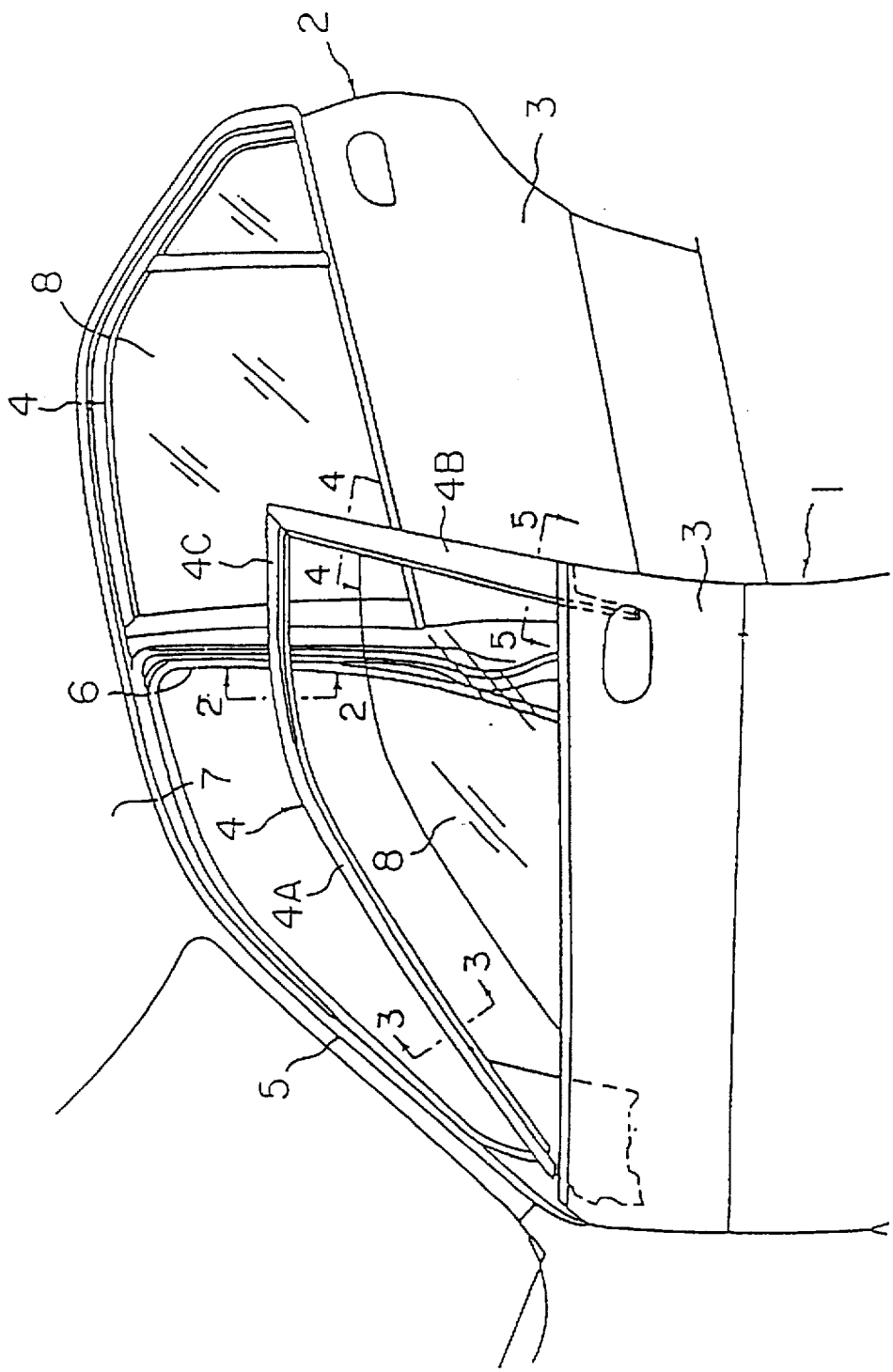
FIG. 1 is a perspective view schematically showing the left side of a passenger vehicle with the side door according to the present invention being mounted thereon.

First of all, explanations will be given on one embodiment of the present invention in reference to the accompanying drawing. FIG. 1 is a perspective view representing the door portion at the left side of a passenger automobile, wherein the front door 1 is shown to be half open, while the rear door 2 is closed. Each of the doors 1, 2 is constructed with a door panel 3 at the lower half part and a door sash 4 at the upper half part. The door sash 4 is substantially in the form of a gate with the portions 4A and 4B respectively along the pillars 5 and 6 in the front and rear parts of the vehicle body and the portion 4C along the roof 7 being continuously joined together, wherein the lower end parts of the pillar portions 4A and 4B are inserted into the upper edge of the door panel 3 to be joined together. A side-window glass 8 is supported movably in an up-and-down direction along the door sash 4.

Figure 2:
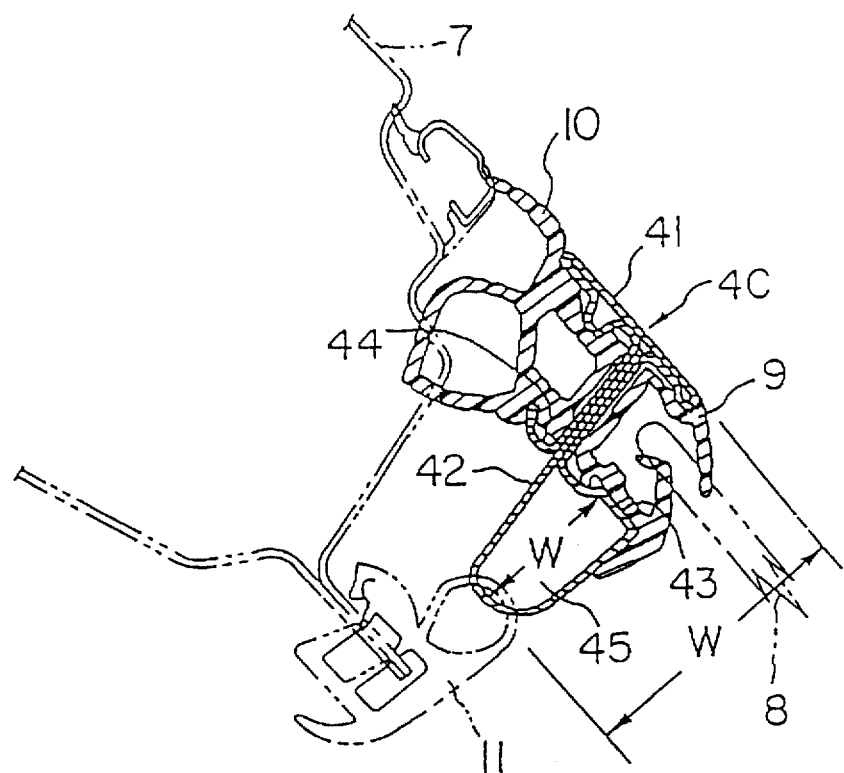
FIG. 2 is a cross-sectional view taken along the line A—A in FIG. 1.
Figure 3:
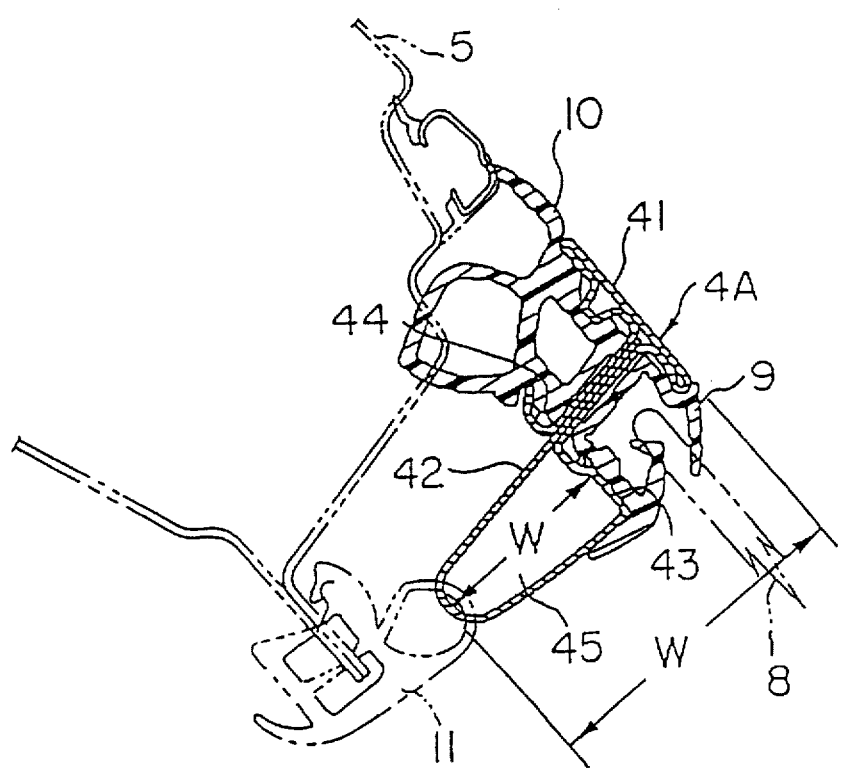
FIG. 3 is a cross-sectional view taken along the line B—B in FIG. 1.

FIG. 2 is a cross-sectional view of the roof portion 4C of the door sash taken along the line 2—2 in FIG. 1, while FIG. 3 is a cross-sectional view the front pillar portion 4A of the door sash taken along the line 3—3 in FIG. 1. The fundamental cross-sectional shape of each of the portions 4A and 4C of the abovementioned door sash is a substantially in a letter "T", of which the horizontal side 41 of the T-shaped door sash faces outward as the decor surface of the vehicle body, and continues from the front pillar portion 4A up to the roof portion 4C with the same width. The vertical side portion 42 of the T-shape protrudes inwardly of the vehicle body as the skeleton part. At the rear surface of the horizontal side 41, there are formed, on both sides of vertical side 42, the holder part 43 of the glass-run 9 and the holder part 44 of the weather strip 10.

A part 45 having a box-shaped transverse cross-section for reinforcement as well as for sealing against water and wind, is formed integrally with the abovementioned vertical side 42 of the T-shape, over the entire length extending from the front pillar portion 4A to the roof portion 4C. The size "w" in the breadthwise direction of the vehicle of the box-shaped transverse cross-sectional part 45 is gradually changed in a manner to be progressively reduced from its lower part toward the upper part. As the result of this, thickness "W" of the door sash 4 in the breadthwise direction of the vehicle becomes progressively thinner from the front pillar portion 4A to the roof portion 4C, i.e., from the lower part toward the upper part of the door sash. A part of the peripheral surface of the box-shaped transverse cross-sectional part 45 serves also as a part of the glass-run holder part 43. In the drawing, a reference numeral 11 designates an opening edge seal of the vehicle body.

Figure 4:
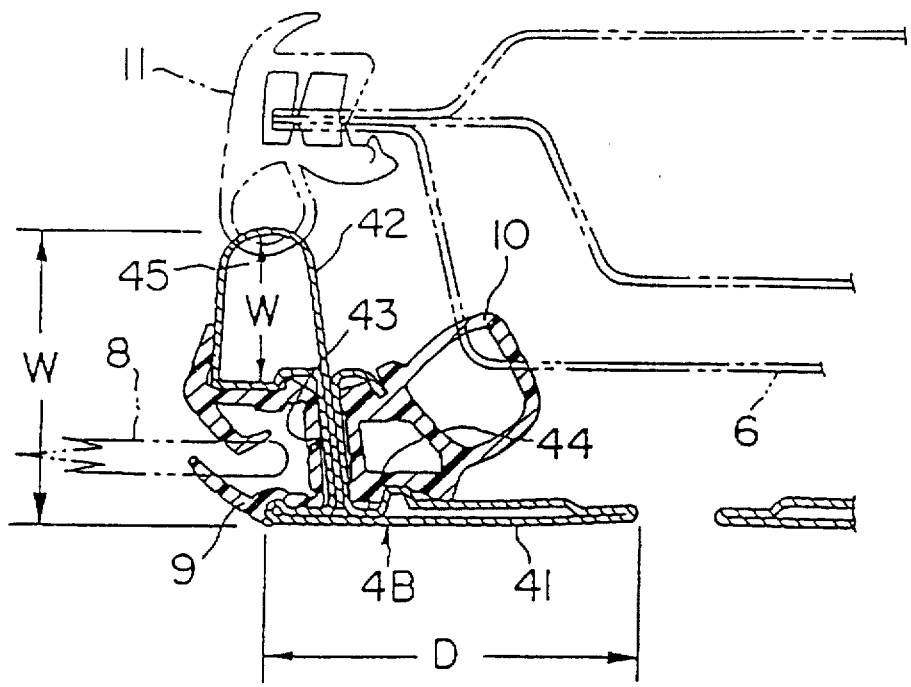
FIG. 4 is a cross-sectional view taken along the line C—C in FIG. 1.
Figure 5:
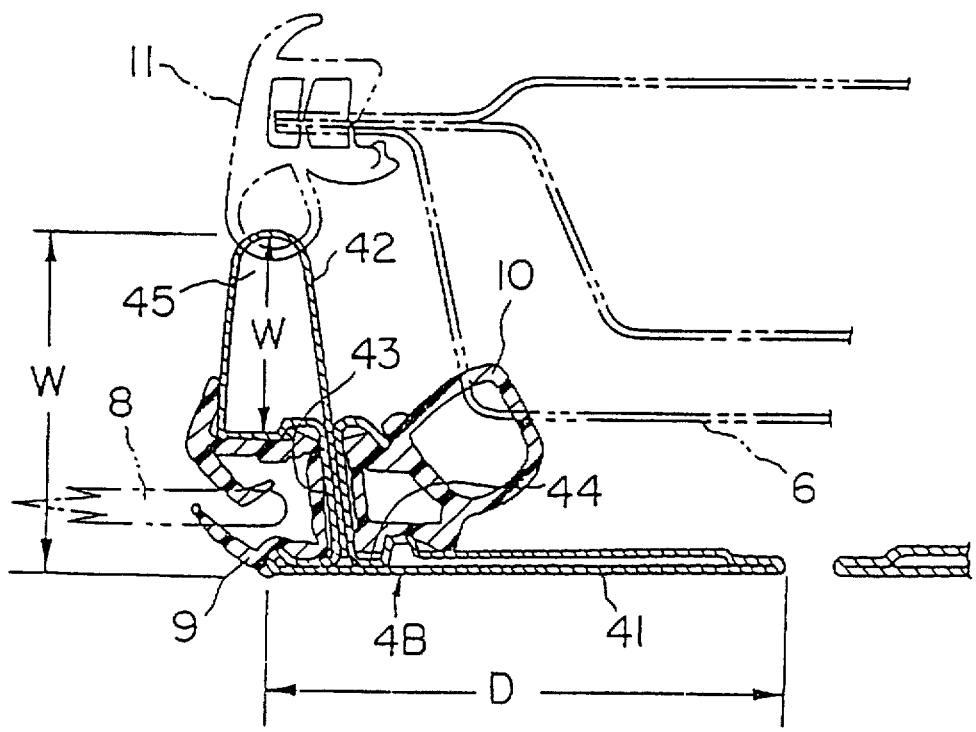
FIG. 5 is a cross-sectional view taken along the line D—D in FIG. 1.

FIG. 4 is a cross-sectional view taken along the line 4—4 in FIG. 1 showing the upper part of the center pillar portion 4B of the door sash, and FIG. 5 is a cross-sectional view taken along the line 5—5 in FIG. 1 also showing the lower part of the center pillar portion 4B. The basic cross-section of the center pillar portion 4B of the abovementioned door sash presents a substantial T-shape as is the case with the abovementioned front pillar portion 4A and roof portion 4C, the horizontal side 41 of the T-shape facing outward of the vehicle body, serving as the decor surface. In particular, the side of this horizontal portion covering the center pillar 6 having a long bulge-out. This decor surface of the center pillar portion 4B, i.e., the horizontal side 41 becomes progressively narrower from its lower part toward the upper part so as to produce an aesthetic or design effect.

It is the same construction as that of the abovementioned front pillar portion 4A toward the roof portion 4C that the vertical side 42 of the T-shape protrudes inwardly of the vehicle body as the skeleton part, and forms the holder part 43 of the glass-run 9 and the holder part 44 of the weather strip 10, on both sides of the vertical side 42 at the rear surface of the horizontal side 41. And, the part 45 having the box-shaped transverse cross-section for reinforcement as well as sealing against water and wind is integrally formed on the abovementioned vertical side 42 of the T-shape, over the entire length of the center pillar portion 4B from its top to bottom, the size "w" of the box-shaped transverse cross-sectional part 45 in the breadthwise direction of the vehicle changing gradually from its top to bottom in a manner to become progressively small. As the result, the thickness "W" of the door sash 4 in the breadthwise direction of the vehicle becomes progressively thin from its lower part toward the upper part.

Figure 6:
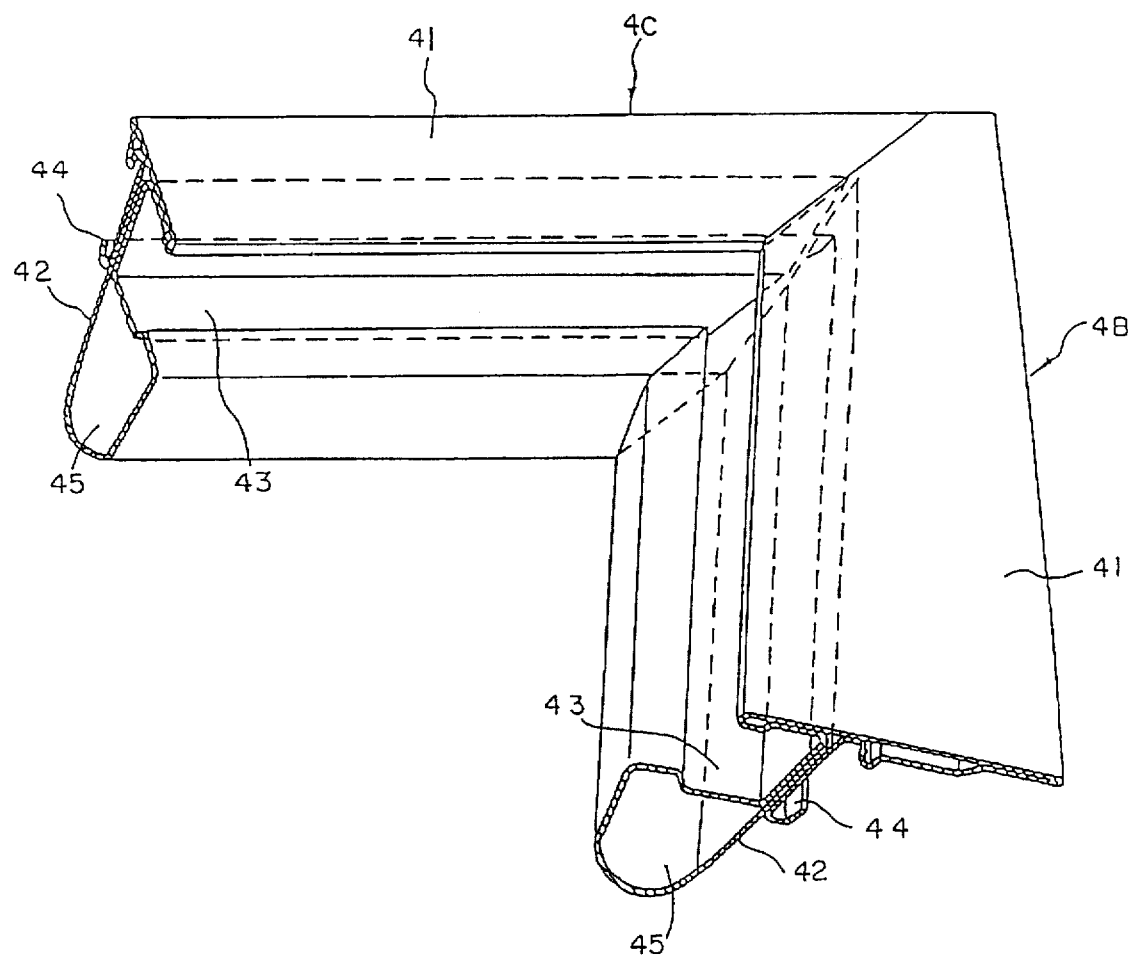
FIG. 6 is a perspective view schematically showing the corner part of the door sash.

FIG. 6 is a perspective view showing the corner part of the door sash, wherein the roof part 4C and the center pillar part 4B are butt-connected. The top end portion of the center pillar part 4B, with the exception of the horizontal side (the decor surface) 41, and the terminal portion of the roof part 4C are formed to have one and the same transverse cross-section, the both parts being integrally joined together by the mutual butt-connection at the slant-cut surface of each end part, whereby there are formed the glass-run holder part 43 and the weather strip holder part 44 which are continuous from the roof part 4C to the center pillar part 4B.

Figure 7A:
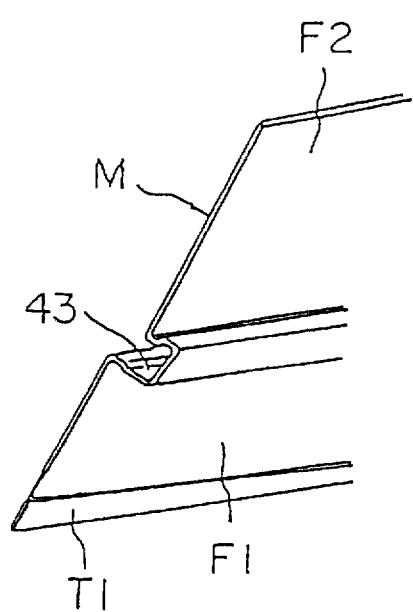

The abovementioned door sash according to the present invention can be constructed by roll-forming of a single sheet of material. Figures (a) through (e) illustrate sequential process steps for roll-forming of the door sash ranging from the front pillar portion to the roof portion of the door sash according to the present invention. Explaining these process steps in pursuance of the drawing figures, when a long web of sheet material M is placed in a roll-forming machine, as shown in FIG. 7(a), there is first formed the glass-run holder part 43, followed by the gradually changing trimming operation T1 as a preparation for forming the box-shaped transverse cross-sectional part.

Figure 7B:
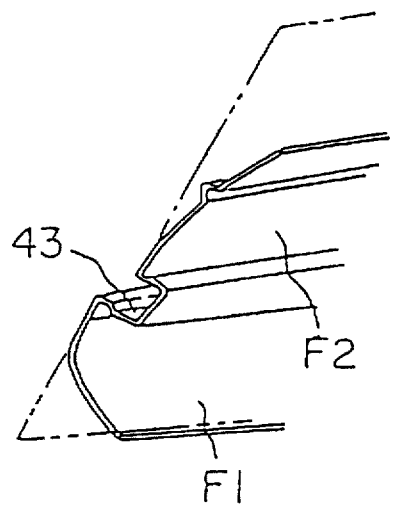
Figure 7C:
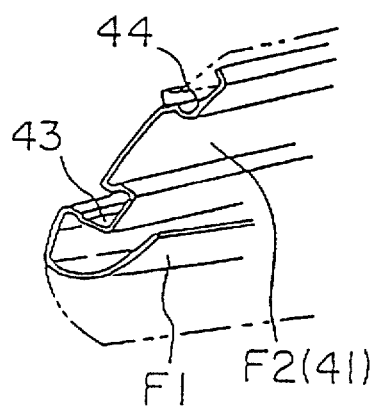
Figure 7D:
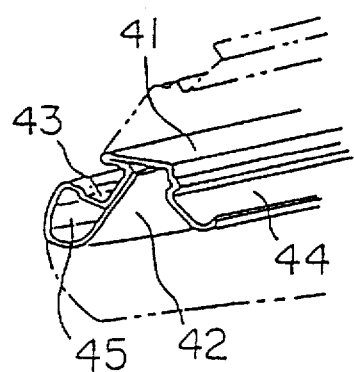

Subsequently, in the sequence of the process steps as shown in FIGS. 7(b), 7(c) and 7(d), the edge part F1 which has been trimmed (T1) is rounded in a manner to be placed over the back surface of the glass-run holder part 43 to thereby form the box-shaped transverse cross-sectional part 45 and the vertical side part (skeleton part) 42. At the same time, the weather strip holder part 44 is formed on the edge part F2 of the side to be the horizontal side (decor surface) 41. Then, this horizontal side (decor surface) 41 is bent over the outer surface of the glass-run holder part 43 to form a T-shaped cross-section with the vertical side (skeleton part) 42.

Figure 7E:
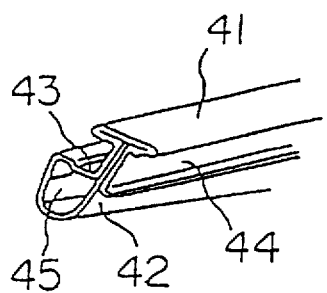

Sequentially, as shown in FIGS. 7(d) and 7(e), the abovementioned weather strip holder part 44, which was formed in conntinuation to the horizontal side (decor surface) 41, is bent over to the back side, whereby the back side of the weather strip holder 44 becomes overlapped with the vertical side (skeleton part) 42. As the result of this, the vertical side (skeleton part) 43 becomes three-fold, whereby the glass-run holder part 43 and the weather strip holder part 44 are positioned on the left and right sides of the vertical side (skeleton part) 42 in back-to-back relation. Finally, the raw material to be formed into the door sash in the aforedescribed manner is severed at the lengthwise position ranging from the front pillar to the roof, followed by subjecting it to bending work with a predetermined curvature to thereby complete the door sash.

FIG. 8 shows sequential process steps for roll-forming of the center pillar portion of the door sash. As shown in FIG. 8(a), when a long web of sheet material M is placed in a roll-forming machine, there is first formed the glass-run holder part 43, followed by the gradually changing trimming T1 as a preparation for forming the box-shaped transverse cross-sectional part.

Figure 8A:
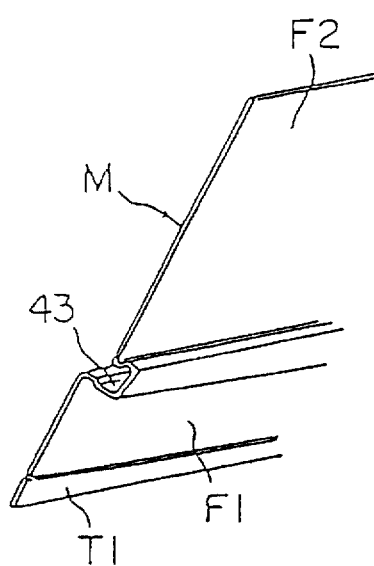
Figure 8B:
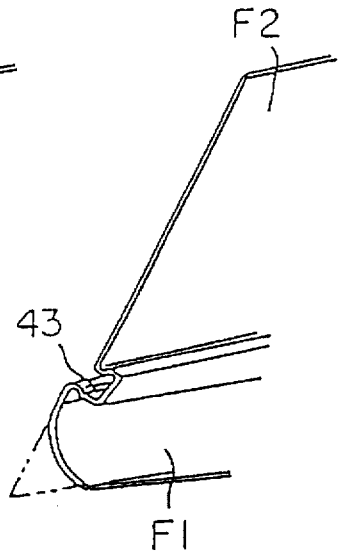
Figure 8C:
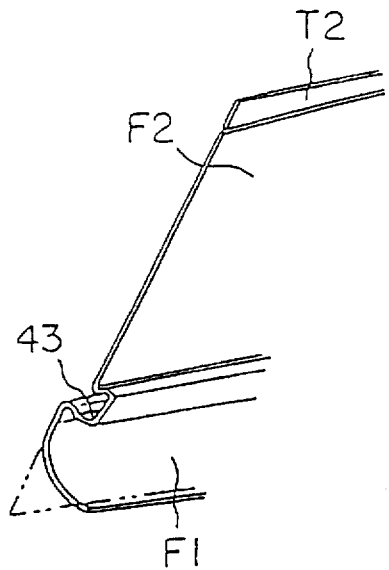

Subsequently, in the process steps as shown in FIGS. 8(b), 8(c), 8(d), 8(e) and 8(f), the edge part F1 which has been trimmed (T1) in a gradually changing manner is rounded to be placed over the back surface of the glass-run holder part 43 to thereby form the box-shaped transverse cross-sectional part 45 and the vertical side part (skeleton part) 42. At the same time, in the course of the process step as shown in FIG. 8(c), there is effected the gradually changing trimming T2 as the preparation for imparting change in width of the side edge F2, opposite to the abovementioned side edge F1, where the width becomes progressively narrow from the lower part to the upper part on the horizontal side (decor surface) to be laid over the center pillar, when the door is closed.

Figure 8D:
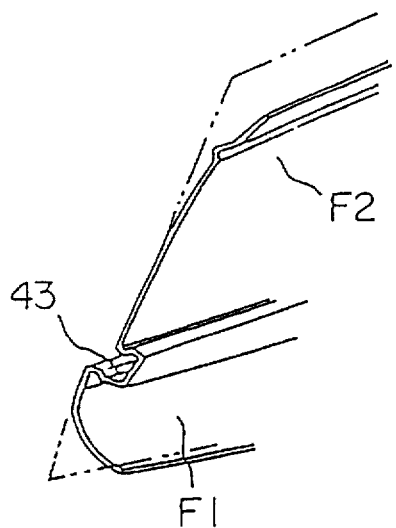
Figure 8E:
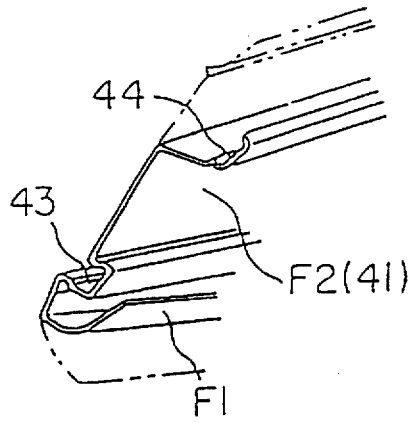
Figure 8F:
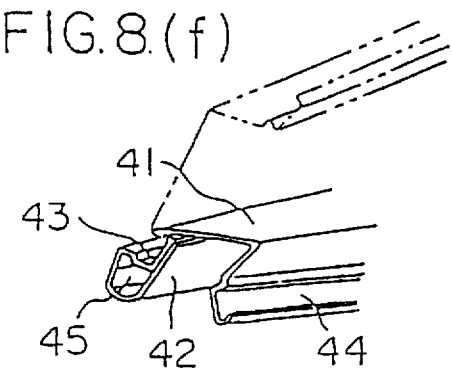

Also, in the sequence of the process steps shown in FIGS. 8(d), 8(e) and 8(f), the weather strip holder 44 is formed on the side edge F2 which has been trimmed (T2) in a gradually changing manner, whereby a surface to become the horizontal side (decor surface) 41 is folded on the outside surface of the glass-run holder part 43, thereby forming a T-shaped cross-section with the vertical side (skeleton part) 42.

Figure 8G:
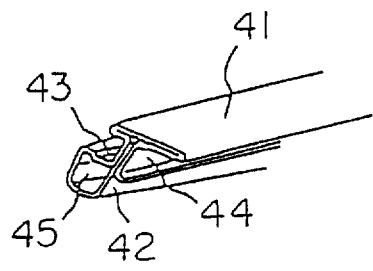

In continuation to these process steps, as shown in FIGS. 8(f) and 8(g), the abovementioned weather strip holder part 44 formed in continuation to the horizontal side (decor surface) 41 is folded to the back side, whereby the back of the weather strip holder part 44 is laid over the vertical side (skeleton part) 42. As the result, this vertical side (skeleton part) 42 becomes three-fold, and the glass-run holder part 43 and the weather strip holder part 44 are positioned on the left and right sides of the vertical side (skeleton part) 42 in a back-to-back relation. The material to be formed into the sash in the above-described manner is finally severed at a position matched with the length of the center pillar, whereby the center pillar part for the door sash, where the width of the horizontal side (decor surface) 41 becomes gradually narrow from the lower part to the upper part, can be completed.

As has so far been described in the foregoing, according to the present invention, the thickness of the door sash for the automobile is made gradually smaller, in the breadthwise direction of the vehicle, ranging from the lower part to the upper part. The variation in thickness of the door sash in the breadthwise direction of the vehicle is such that it is larger at the stud part of the door sash, and is small in the upper part of the door sash, whereby rigidity of the door sash can be increased, and, at the same time, the weight of the door sash is reduced, with further advantage such that the surrounding vision is not hindered by the door sash. Therefore, it is effective as the reinforced structure of the side door for automobiles, particularly passenger cars and small-sized cargo trucks. Furthermore, by replacing the press-formed parts constituting the door sash with the roll-formed parts, the number of the constituent parts can be reduced, whereby the manufacturing cost for the door sash can be reduced.

Although, in the foregoing, the present invention has been described in specific details with reference to its preferred embodiment, the invention is not limited to this embodiment alone, but any changes and modifications in the process steps and construction of the door sash may be made by those persons skilled in the art without departing from the spirit and scope of the invention as recited in the appended claims.

What is claimed is:

1. The method of forming a side door for an automobile having a lengthwise and a breadthwise direction, said side door having an upper sash part, made up of a combined, unitary front pillar and roof portion, and a center pillar portion, and a lower, door panel part, said method comprising roll-forming said front pillar and roof portion from a single sheet of metal to a box shape in transverse cross section, tapering said box shape in breadth from a first, lower end toward a second, upper end and, in the same rollforming operation forming in said single sheet a glass-run holder channel and a weather-strip holder channel; rollforming said center pillar portion from a single sheet of metal to a box shape in transverse cross-section, tapering said box shape in breadth from a first, lower end toward a second end, shaping the cross-section of said center pillar portion second end complementarily to the cross-section of said front pillar and roof portion second end, and in the same roll-forming operation, forming in said single sheet a glassrun holder channel and a weatherstrip holder channel; joining said second ends of said front pillar and roof portion and said center pillar portion, and joining to said lower, door panel part said first end portions of said front pillar and roof portion and of said center pillar portion.

* * * * *